Jan. 17, 1967  P. V. BIGSBY, JR., ETAL  3,298,263
SLITTING METHOD AND APPARATUS
Filed April 13, 1965                    2 Sheets-Sheet 2

INVENTORS
PAUL V. BIGSBY, JR. &
BOBBY STILWELL
BY
Channing L. Richards &
Dalbert U. Shefte
ATTORNEYS 3,298,263
SLITTING METHOD AND APPARATUS
Paul V. Bigsby, Jr., and Bobby Stilwell, Hickory, N.C., assignors to Snyder Paper Corporation, Hickory, N.C., a corporation of North Carolina
Filed Apr. 13, 1965, Ser. No. 447,786
5 Claims. (Cl. 83—4)

This invention relates generally to a method and apparatus for slitting a block of relatively flexible material, and more particularly to an arrangement for slitting a block of such material into a plurality of stacked layers in a continuous operation which reduces considerably the time and attention heretofore required for similar operations and greatly facilitates the manufacture of furniture cushion structures made from such material.

Because latex foam rubber and other elastomeric materials such as polyurethane foam are usually produced and stocked in units which are relatively thick, it often becomes necessary to slit blocks of this material into a plurality of layers to meet particular specifications as, for example, in the furniture industry where foam material of varying thickness and firmness is required in the manufacture of cushion structures.

Heretofore, slitting operations of this sort have been carried out by placing a block of latex foam rubber or the like on a vertically adjustable table and passing the block through a band saw a plurality of times at different vertical levels to produce the desired number of layers at a desired thickness. In addition to the large amount of time and effort required by this operation, the flexible nature of the material has caused it to become distorted by the action of the saw blade during the terminal phase of each pass therethrough resulting in uneven slitting unless the block was manually held against distortion.

The present invention eliminates these drawbacks by providing an arrangement for continuously slitting a block of relatively flexible material into a plurality of layers without distortion.

According to the present invention, a block of latex foam rubber or similar elastomeric material having opposite surface portions lying in parallel planes is movably supported at one of such surface portions for movement along the plane thereof, and the block is sequentially and concurrently slit along at least two planes parallel to the surface portions of the block while a frictional grip is imposed at the other of the surface portions for guiding and holding the block in advance of each sequential slitting and simultaneously restraining the block against distortion during the terminal phase of each preceding slitting, all as described in detail below in connection with the accompanying drawings, in which:

Figure 1:
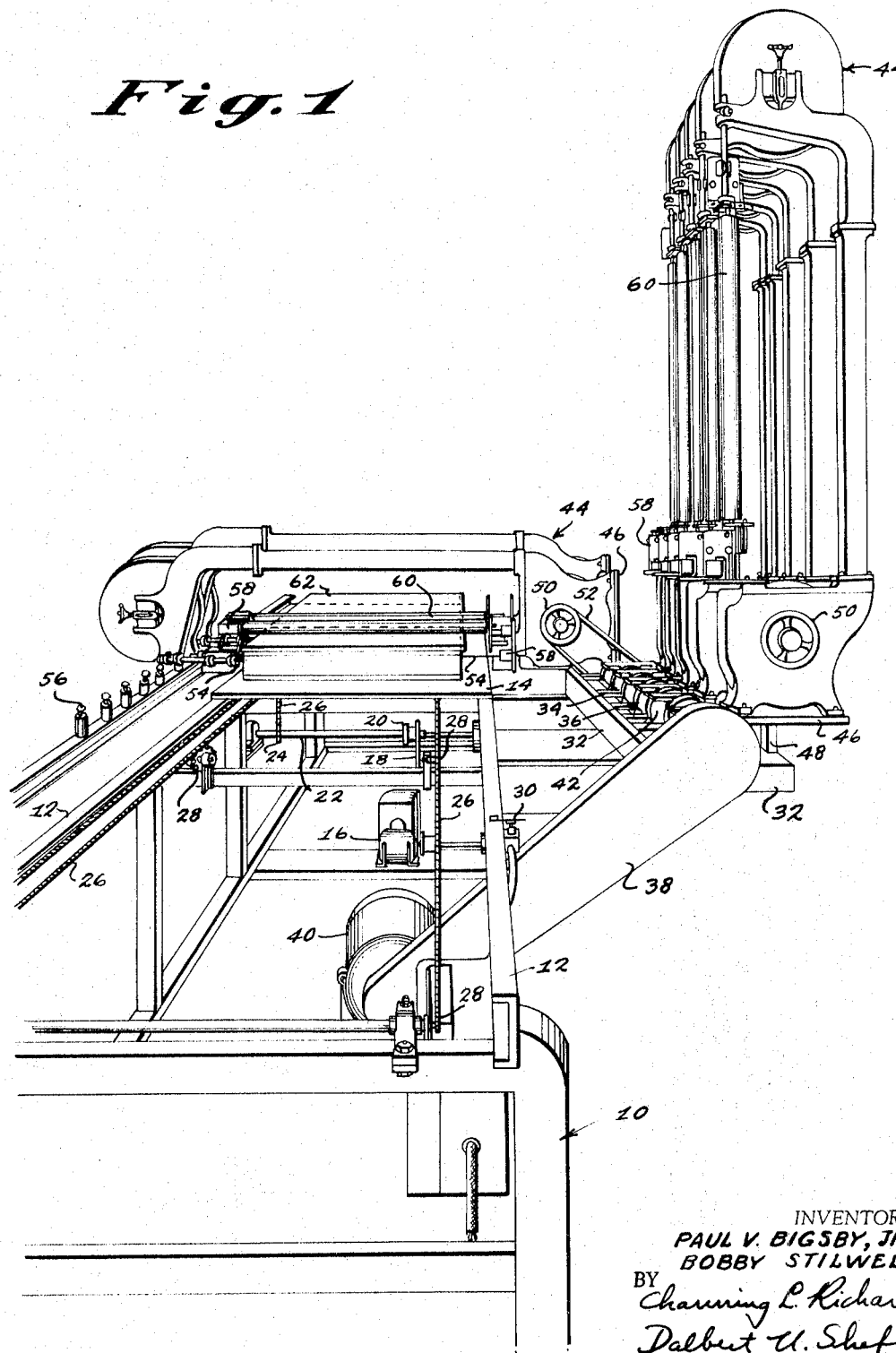
FIG. 1 is a perspective view of slitting apparatus embodying the features of the present invention.

Referring now in detail to the drawings, the illustrated embodiment of the present invention comprises a slitting machine having a support structure, generally indicated by reference numeral 10, including a pair of parallel beams 12 movably supporting a horizontal table 14 having wheels (not shown) attached to the underside thereof riding the lower flat surfaces at the inside of beams 12. A two-speed reversible motor 16 is connected by belt 18 to a variable speed pulley 20 fixed to shaft 22 to move table 14 through drive gears 24 and associated chains 26 attached at each of their ends to the bottom of table 14 and passing over several idler gear wheels 28 located so as to eliminate excessive slack in the chains 26. A start-stop switch (not shown) is provided at the front end of the machine (in background of FIG. 1) to energize reversible motor 16 and move table 14 to the back end of the machine where limit switches 30 disposed in the path of table 14 will automatically de-energize motor 16 and stop movement of the table 14. A second start-stop switch and limit switch arrangement (not shown) is provided to return the table to the front end of the machine in a similar manner.

Support structure 10 also includes a rectangular support piece 32 divided into open sections 34 by cross members 36 each having a journal bearing fixed thereon for supporting a drive shaft (not shown) in parallel relation to the path of moving table 14. The drive shaft is driven through a pulley arrangement 38 by electric motor 40 located near the back end of the machine, and has a plurality of drive pulleys 42, seven in the illustrated embodiment, attached thereto and arranged to rotate therewith in one of the open sections 34. An equal number of band saw units generally indicated by reference numeral 44 are individually mounted for pivotal movement about the drive shaft by a plate element 46 and journal bearings (not shown) attached thereto so that each unit 44 may be selectively shiftable from an operative horizontal position (as indicated by the first two units 44 in FIG. 1) to an inoperative vertical position (as indicated by the last five units 44 in FIG. 1) where plate 46 rests on a vertical stanchion 48 provided on support piece 32 for this purpose.

Each saw unit 44 is identical and includes a driven pulley 50 which can be connected to a corresponding drive pulley 42 by a belt 52 to drive a flat horizontally disposed endless saw blade 54 in a conventional manner. Each saw blade 54 has a reach which extends laterally across movable table 14, and each unit 44 is made vertically adjustable for locating and leveling the saw blade 54 with respect to table 14. This adjusting arrangement includes an adjustable nut 56 disposed to support the saw unit 44 at one side of table 14 and, on the other side thereof, an adjustable connection is provided between the plate element 46 and the attached journal bearings which permits relative vertical movement of plate element 46 with respect to the drive shaft (not shown); a suitable adjustable connection of the sort being a connecting bolt and vertical slot arrangement between plate element 46 and its associated journal bearing (not shown). The reaching portion of each saw blade 54 is disposed between a pair of conventional rib guard elements (visible together with saw blade 54) disposed on either side thereof to reduce frictional loss as the saw blade 54 passes through the material to be cut. In addition, each saw unit 44 is provided with adjusting stations, generally indicated by reference numeral 58, located at each end of the lateral reach of saw blade 54 for maintaining the rib guards taut and the cutting edge of saw blade 54 projecting beyond the rib guards sufficiently to assure a proper cutting exposure thereof. Finally, each saw unit 44 has a roller member 60 connected at its ends to associated adjusting stations 58 so as to be vertically and horizontally adjustable. For example, a suitable connection of this sort is a link element rotatably supporting each end of roller 60 and mounted at each of the adjusting stations 58 by a slot and stud arrangement which permits selective sliding and pivoting of the link to adjust the position of the roller 60.

Figure 2:
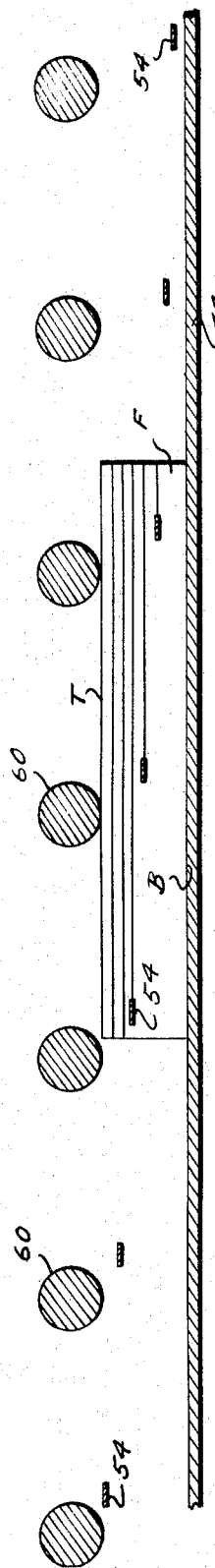
FIG. 2 is a diagrammatic view illustrating a slitting operation being carried out in accordance with the present invention by the slitting apparatus illustrated in FIG. 1.

FIG. 2 illustrates diagrammatically a slitting operation carried out according to the present invention by the machine described above to slit a block F of latex foam rubber or similar elastomeric material into eight layers of equal thickness. The block B has top and bottom surfaces T and B, respectively, which lie in parallel planes, and table 14, illustrated as continuous to indicate its path of travel, supports the block F at bottom surface B for movement along the plane thereof from left to right in FIG. 2 as indicated by the arrow. The top surface of table 14 is slightly roughened to assist in preventing sliding or other movement of the block F with respect thereto as it is carried along, and it will be understood that table 14 could be replaced by an endless conveyor belt or other equivalent structure for transporting block F in a like manner. All seven saw units 44 are shifted to their horizontal or operative position and adjusted vertically and leveled at each end thereof so that the saw blade 54 of the saw unit 44 at the extreme left in FIG. 2 slits the block F along a horizontal plane which is parallel to the top surface T and vertically spaced therefrom by a selected distance; each succeeding saw blade 54 being positioned below the preceding saw blade 54 in a like manner. The roller 60 of each saw unit 44 is adjusted so that it will stabilize block F by imposing a frictional grip at the surface T at a restricted lateral zone defined by the area of contact therewith as the block F is passed through the saw units 44 in a manner to be described in greater detail herein below.

Figure 3:
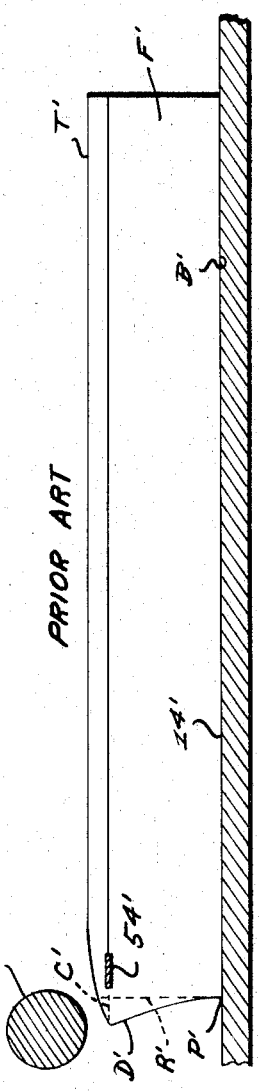
FIG. 3 is a diagrammatic view of a prior art slitting operation illustrating the distortion of the block being slit during the terminal phase of the operation.

To initiate the slitting operation illustrated in FIG. 2, the operator places the block F on table 14 in advance of the initial saw unit 44 (at the extreme left of FIG. 2) and energizes the reversible motor 16 (FIG. 1) by closing the stop-start switch at the front end of the machine. As the table 14 moves toward the right, the top surface T of block F passes under roller 60 of the first saw unit 44 which rolls across surface T and imposes a frictional grip thereat for guiding and holding block F during its passage through the associated saw blade 54; the roller 60 of each sequential saw unit 44 acting in a similar manner. In addition to this guiding and holding function of rollers 60, they also act to prevent the previously mentioned distortion of block F in a manner which can best be described by referring to the prior art arrangement diagrammatically illustrated in FIG. 3.

This prior art arrangement includes a movable table 14', a single saw blade 54' and a roller 60' which correspond substantially with like numbered elements in the individual saw units 50 of the present invention and which are arranged similarly for slitting a block F' as it is passed through saw blade 54'. With this arrangement, however, it was necessary for the block F' to be returned to the front of saw blade 54' and make a separate pass therethrough for each layer to be slit, and the table 14' had to be vertically raised by a predetermined amount at the beginning of each pass. In addition, it was found that as the block F' reached the terminal phase of its pass through the saw blade 54' the normally vertical rear face R' (indicated by dotted lines in FIG. 3) became distorted as indicated at D' so that the saw blade 54' slit the block F' along line C' resulting in uneven layers unless the operator placed his hand on surface T' beyond saw blade 54' to hold the block F' against this distortion. Apparently, the resulting force of the stationary saw blade 54' against the moving block F', which normally would tend to tip a rigid block about point P', acts to cause distortion of the block F' because of the relatively flexible nature of the elastomeric material of which it was formed.

To preclude this distortion, rollers 60 of the successive saw units 44 of the present invention (FIG. 2) are located so that the frictional grip which each imposes on top surface T, in addition to guiding and holding block F during the sequential and concurrent slitting thereof as previously described, will simultaneously oppose the harmful effect of the saw blade 54 during the terminal phase of a preceding slitting and restrain the block F against distortion. Thus, the block F in FIG. 2 is illustrated at the terminal phase of slitting at the third saw blade 54 as it is being held against distortion thereat by the frictional grip imposed by both of rollers 60 of the fourth and fifth saw units 44. In the particular operation illustrated in FIG. 2, the rollers 60 are spaced horizontally 10¼ inches apart, so that a block F having a usual length of 23-27 inches will always be in contact with two rollers 60. However, the frictional grip imposed by one roller 70 is sufficient to restrain a block against distortion, hence a block having a much shorter length could be slit by this operation if desired. Also, the last saw unit 44 is arranged to slit the block F in a plane which is located relatively close (e.g., ½ inch) to bottom surface B so that the weight of that portion of block F above this plane provides sufficient force to restrain the block against distortion, hence no additional roller need be provided beyond the final saw unit 44. However, it is to be understood that it is within the scope of the present invention to provide such an additional roller if needed. Similarly, it is within the scope of the present invention to substitute for the plurality of rollers 60 a continuous conveyor adjacent the top surface T of traveling block F to impose the necessary friction grip thereat.

One practical application of the slitting arrangement illustrated in FIG. 2 is to slit a block of supersoft or medium-grade latex foam rubber having a thickness of 4 inches into eight layers each having a thickness of ½ inch which might be used as cover members for cushion structures of the type described and claimed in copending application Serial No. 393,195, filed August 31, 1964, now U.S. Patent No. 3,188,665, issued June 15, 1965. For this operation, the rollers 60 are set approximately 4 inches above the table 14 so that they will not unduly compress the flexible block F yet will maintain the necessary frictional grip thereat, and the saw units 44 are vertically adjusted so as to position saw blades 54 in descending increments of ½ inch.

Figure 4:
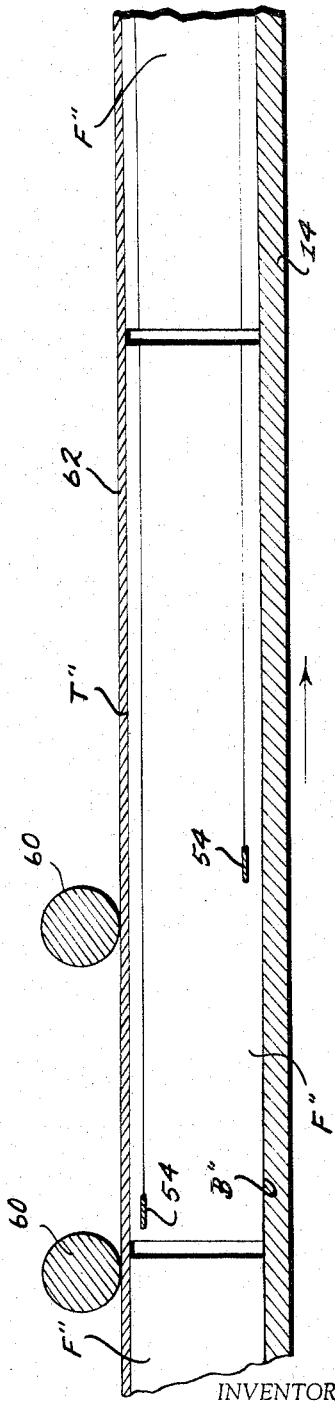
FIG. 4 is a diagrammatic view illustrating a further slitting operation being carried out in accordance with the present invention by the slitting apparatus illustrated in FIG. 1.

FIG. 4 diagrammatically illustrates an alternate operation according to the present invention utilizing only two saw units 44 arranged substantially as illustrated in FIG. 1. In this operation, several blocks F'' (three illustrated) are placed on table 14 and a template member 62 conveniently made from a ½-inch thickness of plywood is laid across the top surfaces T'' thereof, and the rollers 60 are adjusted vertically to accommodate the added thickness of the template member 62. As the blocks F'' pass through the two saw units 44, the rollers 60 ride the top surface of template member 62 and the frictional grip imposed on the blocks F'' is distributed throughout the entire top surfaces T'' thereof to provide even greater assurance against distortion than if the rollers 60 are arranged to act directly against the block as illustrated in FIG. 2.

The operation illustrated in FIG. 4 may also be employed conveniently in the manufacture of cushion structures described and claimed in the aforementioned copending application, although in a somewhat different manner. The blocks F'' are slit in two planes, the first of which is located relatively near the top surface T'' and the second located relatively near the bottom surfaces B''. Thus, the blocks F'' are divided into a thick center layer and two thin layers which provide, respectively, a base element and two cover members which, after interposing layers of fibrous material, may be joined at the base element as disclosed in the aforementioned U.S. Patent No. 3,188,665 to form a cushion structure. A typical slitting operation of this type is to slit blocks F'', which are 4 inches thick, along parallel planes spaced ½ inch from the top and bottom surfaces T'' and B'', respectively. With this arrangement, the blocks F'' may be shaped to a desired contour in plan before slitting, and the resulting cover members and base elements will be perfectly matched.

This invention has been described in detail above for purposes of illustration only and is not intended to be limited by this description or otherwise except as defined in the appended claims.

We claim:
1. A method of slitting into layers a block of relatively flexible elastomeric material having opposite surface portions lying in two parallel planes comprising the steps of movably supporting said block at one of said surface portions for movement along the plane thereof, and sequentially and concurrently slitting said block along at least two planes parallel to said surface portions while imposing at the other of said surface portions a frictional grip located with respect to said slitting of said block for guiding and holding said block in advance of each sequential slitting and simultaneously restraining said block against distortion during the terminal phase of each preceding slitting.

2. A method of slitting into layers a block of relatively flexible elastomeric material having opposite surface portions lying in two parallel planes comprising the steps of movably supporting said block at one of said surface portions for movement along the plane thereof, and sequentially and concurrently slitting said block along at least two planes parallel to said surface portions with the plane of the initial slitting located relatively near the other of said surface portions and the plane of the last slitting located relatively near the first-mentioned surface portion while imposing at the other of said surface portions a frictional grip located with respect to said slitting of said block for guiding and holding said block in advance of each sequential slitting and simultaneously restraining said block against distortion during the terminal phase of each preceding slitting.

3. Apparatus for slitting a block of relatively flexible elastomeric material having two opposite surface portions lying in two parallel planes including a movable support means for supporting said block at one of said surface portions for movement along the plane thereof, a plurality of slitting means disposed in the path of movement of said block for sequentially and concurrently slitting said block along at least two planes parale to said surface portions, and stabilizing means arranged to impose at the other of said surface portions a frictional grip located with respect to said slitting of said block for guiding and holding said block in advance of each sequential slitting means and simultaneously restraining said block against distortion during the terminal phase of slitting of each preceding slitting means.

4. Apparatus for slitting a block of relatively flexible elastomeric material as described in claim 3 and further characterized in that said stabilizing means includes a roller member disposed in advance of each of said slitting means for frictionally gripping said other surface portion of said block at a restricted lateral zone thereof.

5. Apparatus for slitting a block of relatively flexible elastomeric material having two opposite surface portions lying in parallel planes including a movable support means for supporting said block at one of said surface portions for movement along the plane thereof, a plurality of slitting means disposed in the path of movement of said block for sequentially and concurrently slitting said block along at least two planes parallel to said surface portions, and stabilizing means including a template element adapted to be carried by said other surface portion of said block and a roller member disposed in advance of each of said slitting means for riding said template element to impose a frictional grip at the other of said surface portions for guiding and holding said block in advance of each sequential slitting means and simultaneously restraining said block against distortion during the terminal phase of slitting of each preceding slitting means.

References Cited by the Examiner

UNITED STATES PATENTS

| | | | |
|---|---|---|---|
| 1,383,133 | 6/1921 | Lucke | 83—4 X |
| 2,821,254 | 1/1958 | Kernen | 83—4 |
| 3,212,376 | 10/1965 | Berenbak et al. | 83—4 |

WILLIAM W. DYER, JR., *Primary Examiner.*

J. M. MEISTER, *Assistant Examiner.*